2,570,414

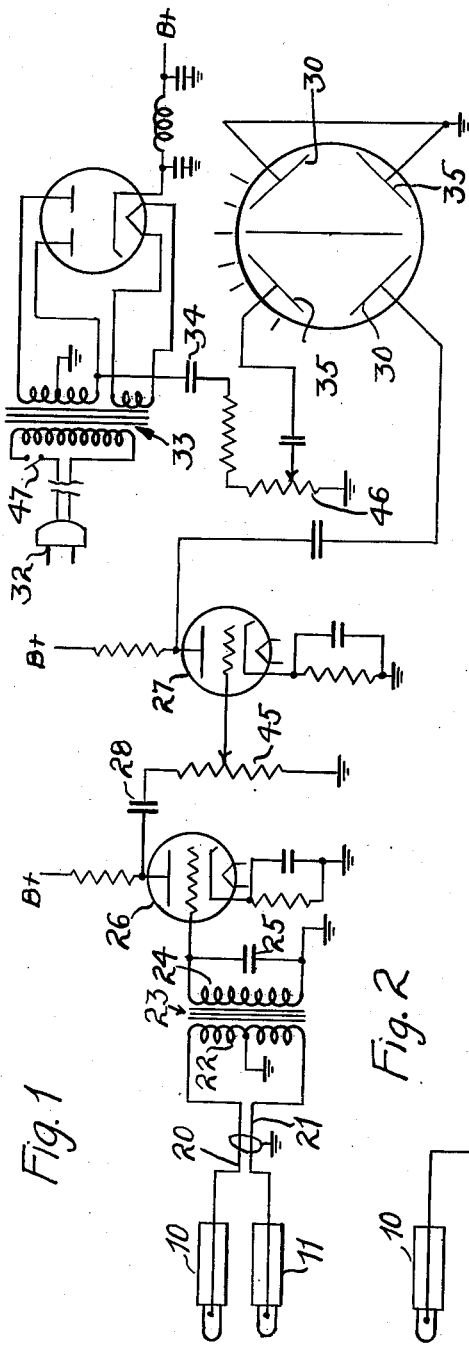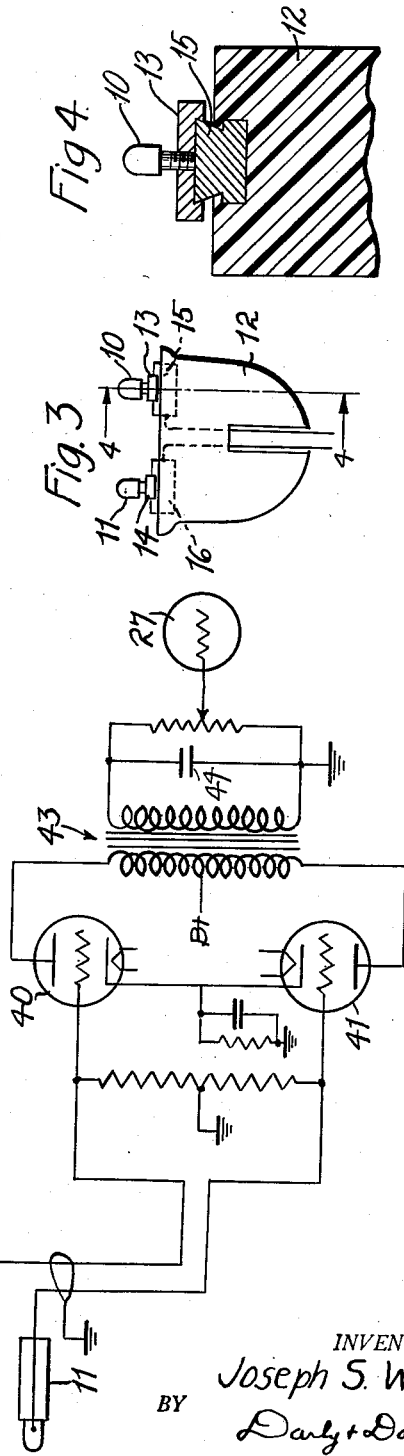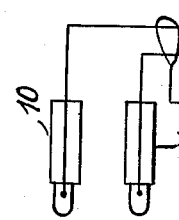
INVENTOR.
Joseph S. Wapner
BY
Darby & Darby
ATTORNEYS Patented Oct. 9, 1951

UNITED STATES PATENT OFFICE 2,570,414

ELECTRONIC METHOD AND APPARATUS FOR DETERMINING POTENTIAL UNBALANCE

Joseph S. Wapner, Brooklyn, N. Y., assignor to Franklin P. Radest and Joseph Wapner, copartners, doing business as R & W Instrument Co., Brooklyn, N. Y.

Application April 17, 1947, Serial No. 742,001

4 Claims. (Cl. 128—2.1)

1

The present invention relates to a method and apparatus for determining the differences in electrical potential resulting from the condition of the human body. More particularly still it relates to a method for such diagnosis in which electronic apparatus is utilized.

Many tests have conclusively proven that the conductivity of a member of the body differs in accordance with the healthy condition thereof. This fact has been availed of to determine ailments in accordance with the results procured, for example, by the reading of minute currents but these results were inaccurate and difficult to interpret because of the very fact that the current flow was so extremely minute and, therefore, extremely sensitive instruments had to be utilized and were, nevertheless, frequently not sensitive enough to give accurate indications of the conditions prevailing.

The present invention compares the electrical differences and represents them as a straight line on the screen of a cathode ray tube or oscilloscope. In general, the mode of operation is to compare the potential present at two symmetrically opposite points and thus determine whether or not one of the members is either misplaced or diseased or otherwise other than normal.

By my invention the potentials developed at the two points under investigation are combined in a circuit in opposition so that if these potentials are equal no resulting current flows. Whatever current does flow is amplified and impressed upon a pair of deflection plates of a cathode ray tube, for example, the horizontal deflection plates of such a tube. The vertical deflection plates of the tube are then fed with a current of the same frequency as that picked up at the points under investigation and either in phase or in phase opposition to that current. As a result, a straight line appears upon the screen of the cathode ray tube and is deflected from its normal position in accordance with the difference between the two potentials picked up at the points under investigation. Furthermore, the deflection is in a direction depending upon which one of the two points under investigation has the higher potential.

In the above it has been indicated that the potential utilized is an alternating one and this results from the fact that wherever a power transformer operating on ordinary 60 cycle alternating current power supply is utilized there are stray currents which are picked up by the human body acting as an antenna and it is these stray potentials and the magnitude thereof existing at

2 particular points in the body under investigation which provide the input signal to my device.

It is an object of the invention to provide electronic means and apparatus for performing medical diagnosis.

It is another object of the invention to provide such electronic means which utilizes a cathode ray tube as an indicator of an out of balance condition and thus as an indicator of an abnormal condition in the human body.

It is a further object of the invention to utilize the stray alternating current field present at any point where the equipment is utilized when connected to a power supply as the source of input current for the electronic measuring device.

Other objects and features will appear when the following description is considered in connection with the annexed drawings, in which Figure 1 is a circuit diagram of one form of my invention;

Figure 2 is a schematic diagram of a modified form of the invention utilizing a push-pull amplifier in place of a two stage amplifier fed from a center tapped transformer;

Figure 3 is a side elevation of a probing member of particular utility in connection with my invention when the comparison effected is between potentials existing on either side of the spine at points on the surface immediately adjacent points on the underlying vertebra equally spaced from the spinal column; and Figure 4 is a transverse cross-sectional view of the plug of Figure 3 taken on the plane of the line 4—4 of that figure and illustrating a suitable mode of construction for rendering the two probes adjustable outwardly from the center line.

As an example of the use of my invention, it should be stated that it is common practice today in the chiropractic art to utilize electrical means for comparing the current flow through the body and specifically through points equally spaced on either side of the spine and overlying a particular vertebra. In this method it is customary to utilize a direct current and to cause the patient to hold a lead from a source of supply. The minute current then passes through the body and to a probe or contact placed upon the particular vertebra under consideration and the reading taken therefrom is then compared with another reading taken along the same vertebra an equal distance on the opposite side of the spine, the circuit, of course, being completed through a meter and back to the opposite side of the source of supply. The comparison of the readings whether made simultaneously or sequentially is indicative to a skilled practitioner of the state of the member under investigation, i. e. whether that member is healthy or not or is displaced from its normal location. In fact, in some instances, such investigation will not only determine that there is a displacement but will indicate the direction and extent thereof.

My invention, as has been indicated, is suitable for use in the method just above outlined but it, however, substitutes the potential picked up by the human body acting as an antenna for the direct current supply in the older method and, further, makes use of an accurate indicator in the form of cathode ray tube in place of the sensitive but barely sufficiently sensitive meter formerly utilized.

In describing my device and the circuits thereof, the method of comparing potentials at points equally spaced from the spine on either side of a vertebra will be considered although it will be understood that my equipment is likewise adaptable to use in determining potential differences in other parts of the body to determine either displacement or disease thereof.

Referring now to the drawings, there is illustrated in Figure 1 at 10 and 11 a pair of probes. When utilizing the spinal column as a determinant of the condition of the body these probes are preferably of the forms shown in Figures 3 and 4 and are equally spaced from the center of the plug 12. The probes, as is clearly shown in Figures 3 and 4, are adjustable outwardly and inwardly from the center line of the plug in order that tests may be made on persons of different size. The mode of adjustment is clearly illustrated in Figures 3 and 4 and comprises threading the probes 10 and 11 into the blocks 13 and 14 respectively, which blocks slide on the rails 15 and 16, the blocks and rails being dovetailed together, as is clearly shown in Figure 4, and being clamped in position by tightening the screw terminations of the probes 10 and 11 against the rails 15 and 16.

Assuming now that the probes 10 and 11 are placed upon a vertebra, one on either side of the spinal column and equally spaced therefrom, potentials existing at these points will be fed through the conductors 20 and 21 to opposite ends of the windings 22 of transformer 23, the center point of which winding is grounded. Thus it will be clear, if the potential existing at the two points is the same and in the same phase, there will be no current flow through the secondary winding 24 of the transformer 23. If, however, there is a difference in potential or a difference in phase, then there will be a 60 cycle current flowing in the winding 24 of transformer 23, which winding is in parallel with a condenser 25, the combination being so chosen as to tune the circuit to the 60 cycle power frequency. The impedance of transformer 23 should be relatively high and I have found that 60,000 ohms is a sufficient impedance to procure proper operation of the circuit. The signal from transformer secondary 24 is fed to the grid of a three element vacuum tube 26 which tube acts as an amplifier and is connected in a conventional manner, the plate and filament supplies being omitted from the drawing.

The output signal from tube 26 is fed through another stage of amplification which may be identical with the tube 26 and which is represented in the drawing as the vacuum tube amplifier 27. In the diagram, the mode of coupling the grid of amplifier 27 to the plate circuit of tube 26 is the coupling condenser 28. The exact coupling means is immaterial and a resistance or transformer coupling might equally well be used.

The output of tube 27 is fed to the horizontal deflection plates 30 of a cathode ray tube 31. The tube 31 is supplied with filament and plate current in the conventional manner and, consequently, these supplies are not shown in the drawing. Power from a 60 cycle alternating current source, as indicated by the power plug 32, is fed by means of a transformer 33 through a coupling condenser 34 to the vertical deflection plates of the cathode ray tube 31. Since the power source is the same source from which the human body under investigation is receiving the alternating current potential, it will be clear that if the potential applied to the probes 10 and 11 is in phase and of equal magnitude a straight line will be produced on the screen which by proper orientation of the tube can be made to be vertical. It will further be clear that any alteration in the magnitude of the potential will cause this line to be deflected to the right or left and that by reversing the probes the condition can be made such that deflection to the right indicates a higher potential on the right side of the spine and deflection to the left a higher potential on the left side of the spine. Thus it is only necessary for the operator after energizing the vacuum tube circuits to place the probe in position and immediately, by observing the movement of the illuminated line on the cathode ray tube screen, determine the direction and amount of potential difference between the two points upon which the probes 10 and 11 rest.

It will also be clear that should there be any displacement in phase either as between the voltages applied to the horizontal and vertical deflection plates or between the voltages applied to the halves of the transformer secondary 22, the result will be an appearance of geometric figures in the nature of ellipses on the screen rather than straight lines. This phenomenon is well known to those skilled in the electronic art and the figures produced are commonly known as Lissajous figures.

In Figure 2 the portion of the circuit prior to the amplifier 27 is illustrated, this portion being a modification of the portion of the circuit to the left of amplifier 27 in Figure 1. The probes 10 and 11 are applied in the same manner as was indicated hereinabove. In this instance two electron tubes 40 and 41 are utilized and arranged in a conventional push-pull circuit feeding the transformer 43, the output circuit 44 of which is in this instance resistance coupled to the grid of tube 27.

In both forms of the invention shown in Figures 1 and 2, sensitivity control is supplied by means of the potentiometer 45 between the amplifiers 26 and 27 in the case of Figure 1 and between the transformer 43 and tube 27 in the case of Figure 2. Likewise in both circuit arrangements a control of the vertical deflection is exerted by means of the potentiometer 46 in the circuit between the transformer 33 and the vertical deflection plates 35 of the cathode ray tube 31.

As is customary, a switch 47 is provided in the circuit between the power plug 32 and the primary winding of the transformer 33 in order that the power may be turned off of the instrument when it is not in use. Additionally, the plate voltages for the various electron tubes are supplied by means of a full wave rectifier 48 connected in the secondary of the transformer 33.

In accordance with the common practice the probes 10 and 11 are shielded in order to prevent the pick up of any voltage by the conductors leading to these probes.

While I have described the utilization of the circuits of my invention in connection with the determination of potentials existing at points equally spaced along a vertebra from the central spinal column, it will be understood that other types of comparisons may be made and that other types of probes may be utilized. Individual probes may be utilized, for example, to compare the potentials of the arms, or the legs. While I have, therefore, described merely an illustrative embodiment of my invention, it will be understood that the application thereof is not to be limited and that any limitations are to be those expressed in the claims, there being no such limitations implied from the foregoing description.

What is claimed is:

1. A device for detecting potential unbalance in the human body comprising, in combination, a pair of probes adapted to be placed alongside a vertebra at points equally distant from the spinal column to pick up from the areas overlying said points along the vertebra potentials of the alternating current power supply, means coupled to said probes for subtractively combining the potentials, a cathode ray tube, means in circuit between said combining means and said cathode ray tube for impressing the difference signal upon one pair of deflection plates of said cathode ray tube, and means coupled to the power supply for impressing a voltage of the power supply frequency upon the other pair of deflection plates of said cathode ray tube to thereby produce an illuminated line upon the screen of said cathode ray tube, said line being deflected from a central position when the potentials at the two points along the vertebra are unequal and remaining centrally located when the said potentials are equal.

2. A device for detecting potential unbalance in the human body, comprising, in combination, a pair of probes adapted to be placed alongside a vertebra at points equally distant from the spinal column to pick up from the areas overlying said points along the vertebra potentials of the alternating current power supply, means coupled to said probes for subtractively combining the potentials, said means comprising a primary winding of a transformer, said primary winding being center tapped and connected to chassis ground, an electron tube amplifier, means in circuit between said combining means and said amplifier for impressing the said difference signal upon the input circuit of said electron tube amplifier, said means comprising a secondary of said transformer, said secondary being part of a resonant circuit tuned to the frequency of the power supply, a cathode ray tube, means in circuit between said amplifier and said cathode ray tube for coupling the output of said amplifier to one pair of deflection plates of said cathode ray tube, and means coupled to the power supply for impressing a signal at the power supply frequency upon the other pair of deflection plates of said cathode ray tube to thereby produce an illuminated line upon the screen of said cathode ray tube, said line being deflected from a central position when the potentials at the two points along the vertebra are unequal and remaining centrally located when the said potentials are equal.

3. A device for detecting potential unbalance in the human body, comprising, in combination, a pair of probes adapted to be placed alongside a vertebra at points equally distant from the spinal column to pick up from the areas overlying said points along the vertebra potentials of the alternating current power supply, means coupled to said probes for subtractively combining the potentials, an electron tube amplifier, means in circuit between said combining means and said amplifier for impressing a signal from said combining means upon said electron tube amplifier, a cathode ray tube, means in circuit between said amplifier and said cathode ray tube for coupling the output of said amplifier to one pair of deflection plates of said cathode ray tube, and means coupled to the power supply for impressing a signal at the power supply frequency upon the other pair of deflection plates of said cathode ray tube to thereby produce an illuminated line upon the screen of said cathode ray tube, said line being deflected from a central position when the potentials at the two points along the vertebra are unequal and remaining centrally located when the said potentials are equal.

4. The method of detecting potential unbalance in the human body which comprises utilizing the potentials present in the human body as a result of the normal alternating current power source, amplifying the potentials derived from points equidistant from the spine along a vertebra, comparing the said amplified potentials, impressing the difference potential upon a pair of deflection plates of a cathode ray tube, applying a potential derived from the same power source to the other pair of plates of a cathode ray tube, and viewing the illuminated line of the screen of said cathode ray tube to thus determine which of the compared body potentials is higher and by what amount, and thus determine the condition of the portions of the body the potentials of which are thus compared.

JOSEPH S. WAPNER.

REFERENCES CITED

The following references are of record in the file of this patent:

UNITED STATES PATENTS

| Number | Name | Date |
|---|---|---|
| 1,648,899 | Hayman | Nov. 15, 1927 |
| 1,715,316 | Thwing | May 28, 1929 |
| 2,457,744 | Sturm | Dec. 28, 1948 |